Sept. 9, 1969     S. T. ATTERBURY     3,466,060

KNOCKDOWN STORAGE BICYCLE

Filed Sept. 28, 1966

Stanley T. Atterbury

United States Patent Office 3,466,060
Patented Sept. 9, 1969

3,466,060
KNOCKDOWN STORAGE BICYCLE
Stanley T. Atterbury, 9745 S. Ingleside Ave.,
Cook County, Ill.
Filed Sept. 28, 1966, Ser. No. 588,234
Int. Cl. B62k 15/00
U.S. Cl. 280—287     1 Claim

ABSTRACT OF THE DISCLOSURE

A knockdown bicycle in two rigid parts, front part with square sleeve extending diagonally from steering post, and rear rigid part with square bar extending diagonally, rear portion with square bar, inserted into square sleeve, and ready to ride.

---

The present invention relates to a knockdown bicycle, and may be used to advantage with my patent issued, Aug. 9, 1966, Patent No. 3,265,405.

Heretofore, bicycles have been bulky, hard to carry, take up a large space when storing. With this invention it is possible to have two rigid parts, front and back, one laid on top of another without damaging parts. Now one part of a bicycle can be carried up and down stairs with safety, very hard to do with the present one piece bicycle. Now boys can carry and assemble the bicycle with very little trouble, a saving in time.

One of the objects of the invention is to have a bicycle with the rigidity of present bicycles, and one that may be knocked down in two parts in two minutes, and assembled in two minutes.

Another object of this invention is to use it in many ways, save parking fees, take the place of a second car, when used and stored in trunk of your car.

Further object of this invention is to have an improved joint, simple to operate and long lasting, and safe to operate.

Other objects will become apparent from the following description in drawings, in which similar characters of reference refer to similar parts in several views.

Referring to the drawings.

Figure 1:
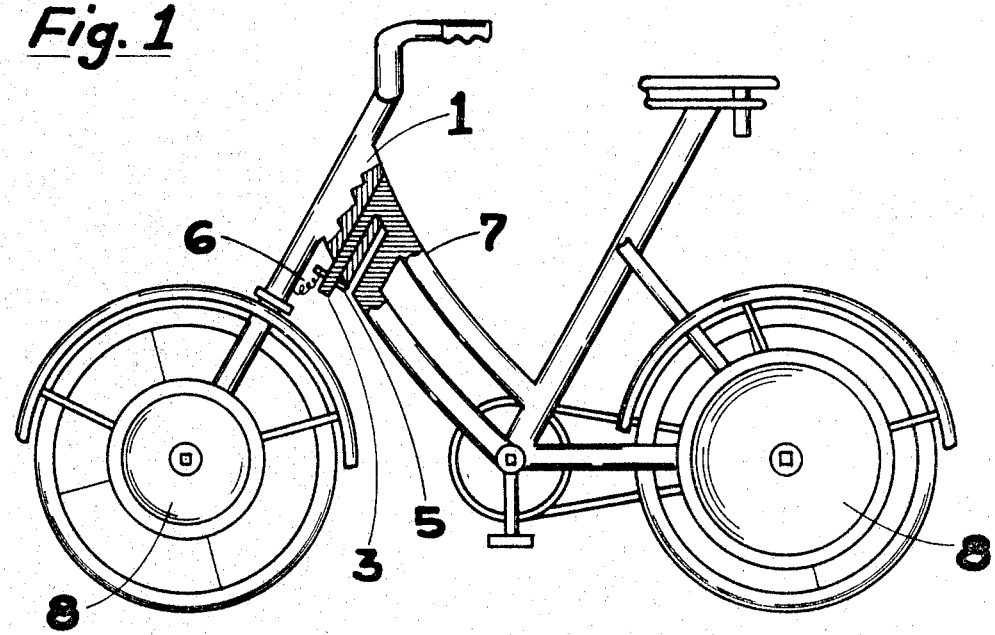
FIGURE 1 is a side elevational view of a girls' bicycle having it in operating condition embodying my invention.
Figure 2:
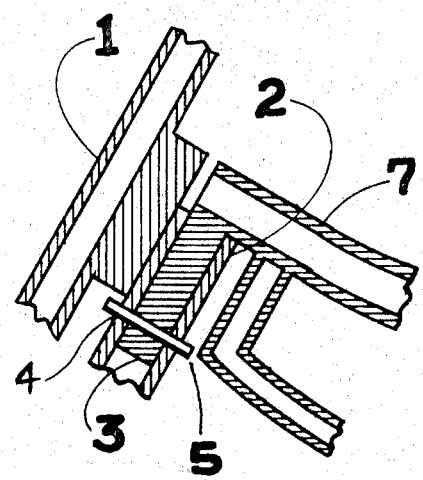
FIGURE 2 is a cross section elevational view of front part and hollow sleeve.
Figure 3:
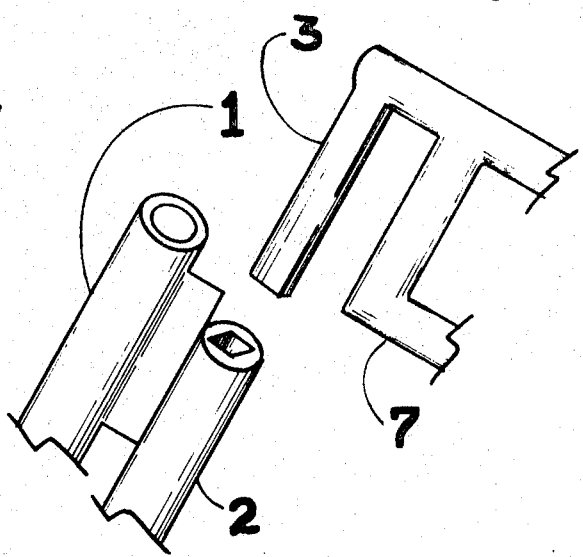
FIGURE 3 is a side elevational view of a cross section of part of bicycle frame when front and rear portions are joined together.

Referring to FIGURE 1, this view shows extension 1 attached to the steering post which is connected to the wheel, and also shows hollow sleeve 2 that is a portion of the extension. The solid square bar 3 is part of rear portion of bicycle, which is inserted into 2, by lifting rear portion of bicycle and inserting from the top, into square sleeve 2. A hole 4 is made near the end of square bar that clears extension 2 at the bottom. The numeral 5 designates a pin that fits the hole 4, and 6 is a chain attached to it. A round bar 7 is parallel to square bar to make rear part rigid, and 8 are two shields attached to center of wheel.

While I have illustrated my invention, modifications may be made without departing from the spirit of my invention.

What I claim as new:

1. In a knockdown bicycle, a first square metal sleeve that is part of front steering post, said front sleeve extending diagonally, a second smaller solid square metal bar that is part of rear portion of said bicycle, said bar extending diagonally at the same angle as front sleeve, a hole through said square bar near the end for a pin, said second part being received in said first sleeve part to assembly the bicycle.

References Cited

UNITED STATES PATENTS

| 722,249 | 3/1903 | Pixley | 287—127 X |
|---|---|---|---|
| 2,771,145 | 11/1956 | Peters | 280—287 X |
| 3,249,171 | 5/1966 | Kinghorn | 280—278 X |
| 3,265,405 | 8/1966 | Atterbury | 280—287 |
| 3,295,863 | 1/1967 | Jaulmes | 280—278 |

KENNETH H. BETTS, Primary Examiner

U.S. Cl. X.R.

287—127